Patented Jan. 16, 1940

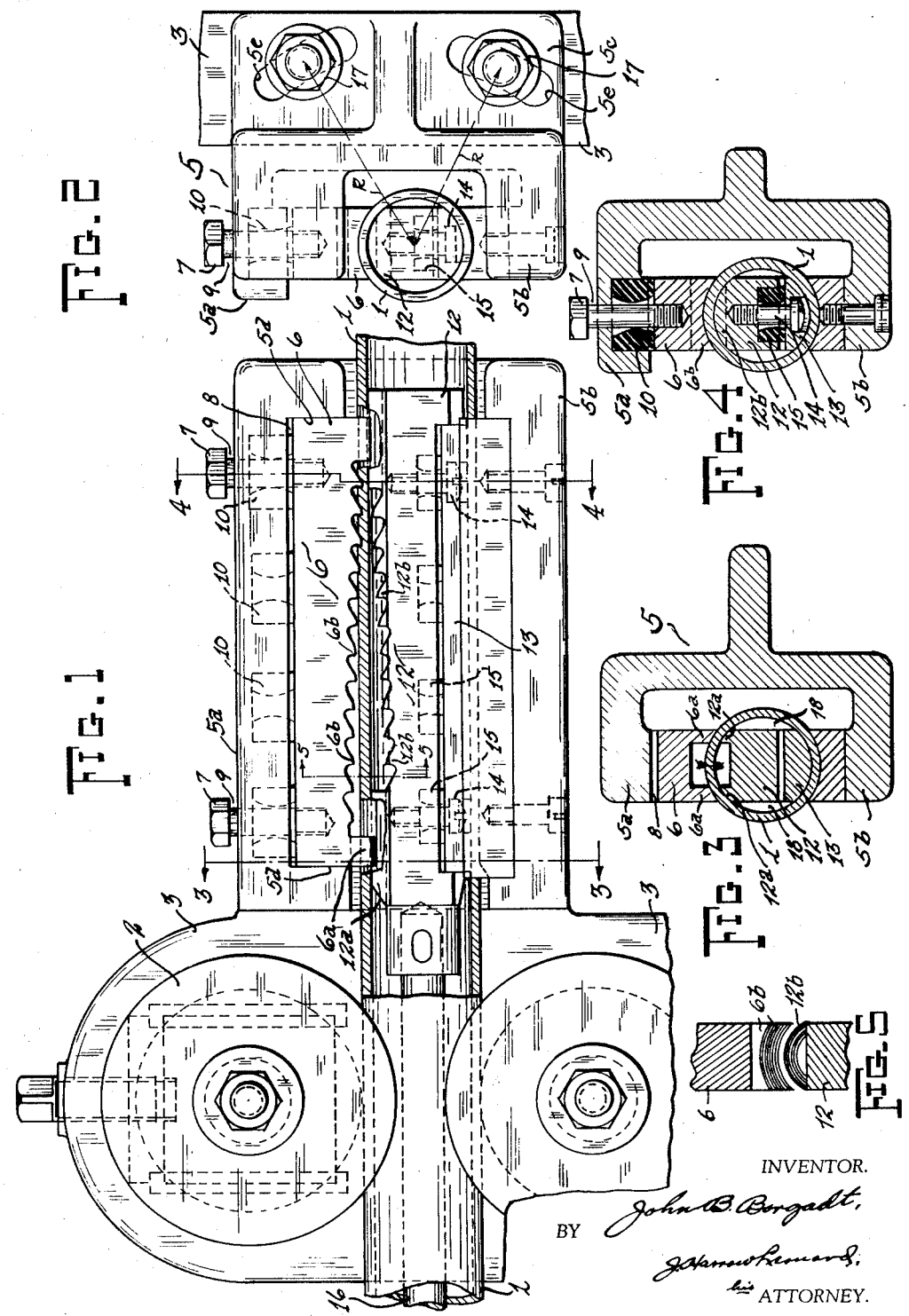

2,187,485

UNITED STATES PATENT OFFICE 2,187,485

APPARATUS FOR FINISHING WELDED TUBING

John B. Borgadt, East Cleveland, Ohio

Application October 9, 1935, Serial No. 44,224

5 Claims. (Cl. 90—33)

This invention relates to an improved apparatus for finishing welded tubing and particularly for removing excess metal and burr along the seam resulting respectively from the upset of the metal adjacent to the seam and the partial extrusion of heated metal at the seam.

As is well known in the art to which the present invention relates, welded tubing possesses certain imperfections along and in the region of the longitudinal seam, both internally and externally of the tubing, in the form of the extruded burr, the thickened stock material and slight irregularities occasioned by the upsetting pressure, the burr, thickened stock, and irregularities usually extending the entire length of the seam of the tubing and varying in size and configuration at different portions.

Attempts have been made to remove these imperforations and shape the tubing to a true, smooth, cylindrical condition by grinding with the result that the freed particles of metal, formerly constituting the imperforations, as well as abrasive, are embedded in the metal. Furthermore, the various means employed for removing of the burr and excess metals and for reshaping the pipe have proven very expensive in operation, especially for removing the imperfections inside of the tube.

One of the principal objects of the present invention is to provide a simple and durable apparatus which cooperates with the tubing, while it is continuously passing from the welding machine, to remove, by positive cutting, the burr, excess material, and irregularities in a manner such that no freed metal or foreign matter is embedded in the tubing.

Another object is to accomplish this result without altering the true cylindrical form of the tubing, but, on the contrary, reshaping the tubing to the degree necessary to provide a true cylindrical form.

More specifically, an object of the invention is to provide a series of internal and external broaches which cooperate with the tubing for gradually and successively removing the burr and excess material, and which automatically and yieldably adjust themselves according to the condition of the tubing at any given point, during the cutting operation, while being constrained to fixed lateral and longitudinal positions.

Another object is to provide broaches for these purposes in which ample clearance is allowed between the broaches and the burr, as the tubing is initially introduced to the broaches, and to provide broaches having a proper degree of curvature to effectively engage the tubing during the various stages of the entire broaching operation for causing a gradual removal of the excess material and final accurate shaping of the tubing.

Another object is to mount the broaching apparatus in such a manner that the broaches can be rotated about the axis of the tubing and thus guided into proper alignment and cooperation with the seam in those instances wherein the tubing tends to twist and dispose the seam to one side or the other of its normal tube position.

Other objects and advantages will become apparent from the following specification wherein reference is made to the drawing in which Fig. 1 is a side elevation of an apparatus embodying the principles of the present invention, part thereof being shown in section for clearness in illustration;

Fig. 2 is an end elevation of the apparatus illustrated in Fig. 1; and

Figs. 3 and 4 are cross sectional views taken on planes indicated by the line 3—3 and 4—4 respectively of Fig. 1.

Fig. 5 is a fragmentary cross sectional view through the external broach and internal broach illustrating the varying radius of the teeth lengthwise of the broaches and is taken on a plane indicated by the line 5—5 of Fig. 1.

For the purposes of illustration, the broaching apparatus is shown in connection with and adapted for use with a continuous welding apparatus wherein the stock to be welded moves continuously along a given path from the welding rolls, its use in connection with welded tubing formed in any other manner being readily apparent therefrom.

Referring to the drawing, the tubing 1 is fed through the rollers 2 in a direction to the right, as viewed in Fig. 1 of the drawing, the rollers 2 being operated so as to feed the tubing continuously to the broaching apparatus.

Attached to the main supporting structure 3 of the roller is a broach supporting frame 5. The frame 5 comprises a pair of spaced yoke arms 5a and 5b and an integral face plate 5c formed integral therewith. The face plate 5c lies in face to face relation to the support 3 so as to be accurately guided for movement in a fixed plane thereby, as will later be described. Carried by the arm 5a is an external broach 6 which is secured to the arm 5a by suitable bolts 7. Clearance is provided between the broach 6 and arm 5a, as indicated at 8, and between the head of the bolt 7 and arm 5a, as indicated at 9, so that the broach 6 is free to move inward and away from its supporting arm 5a. Suitable recesses are provided in the arm 5a and accommodate cushioning means, such as rubber washers 10, which are operatively interposed between the arm 5a and the broach 6 for yieldably urging the broach away from the arm and towards the tubing 1. The broach 6 is constrained from movement longitudinally of the tube 1 by engagement at its ends with suitable end shoulders 5d formed in the arm 5a. This manner of mounting the broach 6 renders the broach free to move yieldably away from the tubing and thus adjust itself to compensate for differences in the thickness of metal to be removed while at the same time being held firmly against the tubing, and to relieve the broach and prevent damage thereto in any instance in which an excessively large amount of metal is presented to the broach.

An internal broach 12 which is in alignment both axially and radially of the tubing with the broach 6 is also provided, the broach 12 being supported by a suitable shoe 13 to which it is secured by bolts 14 corresponding in form and function to the bolt 7 above described. Clearance between the heads of the bolts 14 and both the shoe 13 and tube wall is provided, as also is clearance between the broach 12 and shoe 13, so that the broach may move toward and away from the tube in the same manner as the broach 6. Rubber cushions 15 are also interposed between the shoe 13 and broach 12 for urging the broach 12 into engagement with the work, these cushions being constrained to proper position by a recess formed in the broach 12. Thus the broaches 6 and 12 are both yieldably urged against opposite aligned faces of the same portion of the tubing.

As illustrated in the drawing, the broach 6 has depending laterally spaced side portions 6a at the leading end thereof which, at their lower ends, have a curvature corresponding substantially to the curvature of the particular tube being finished so as to fit comparatively snugly on the outer surface of the tube adjacent and at both sides of the seam while accommodating the burr therebetween. At the face of the broach 6 exposed to the tube, the broach is provided with a plurality of broaching teeth 6b, these teeth being of varying depth so that the group of teeth as a whole define a surface inclined downwardly toward the tube axis in the direction of travel of the tube from the leading end of the broach to the trailing end. The teeth 6b effect progressive removal of the burr and excess material as the tube passes thereunder, the last or trailing teeth conforming in contour substantially to the contour of a perfect cylindrical tube of the particular size being finished. The section of the teeth in a plane through and at right angles to the axis of the tubing, varies from the leading teeth to the trailing teeth, the leading teeth being of somewhat greater radius so as to conform more nearly to the tube as it is initially exposed to the teeth after leaving the welding apparatus, at which point of initial exposure, due to the upset, the tube may be out of round or of greater radius than normal. All of the teeth are curved about a common axis coincident with the axis of the tubing, and are of successively decreased radius from the leading to the trailing tooth.

In the case of the broach 12, the teeth 12b are correspondingly arranged to define a frustroconical surface sloping away from the axis of the tube, or toward the teeth 6b, in the direction of travel of the tube for effecting a corresponding progressive removal of the material. The leading teeth of the broach 12 necessarily are of a shorter radius than the radius of the tube, with progressively increasing radius in the direction of travel. The broach 12 is likewise provided at its leading edge with spaced side portions 12a which engage the inner face of the tube adjacent the seam cleft while accommodating the burr and upset metal therebetween, the edges of the side portions exposed to the tube being of proper configuration to fit the tube at the point of introduction. The trailing teeth, especially the last teeth of the broaches, define concentric cylindrical surfaces spaced apart the exact dimension of the particular stock thickness of the tube being finished so as to impart the final true cylindrical shape to the tube. Thus a broaching throat is defined which is gradually contracted from each radial limit toward the part of the tube engaged from the leading end of the broaches to the trailing end, with the result that the excess material and burr are progressively removed. It often happens, however, that an extreme burr may form at one particular position or that extreme thickness of the metal may result. Due to the spaced side portions 6a and 12a of the broaches, however, and the mounting of the broaches for yielding movement away from the surface being broached, the leading teeth are not subjected to the extreme cut and resultant stresses which would be occasioned by the excessively large amount of metal, but the broach accommodates itself so that regardless of the size of burr or additional thickness of metal the removal thereof is prorated substantially equally to all of the teeth, each removing only its proportional part of the whole.

For securing the inner broach in position, the broach 12 is secured to a suitable rod 16 which is held against axial movement in advance of the seam closing rolls of the welding machine. By rotating the rod 16 about its axis, the inner broach can be rotated so as to follow the seam cleft at all times.

It is desirable also that the outer broach be adjustable so that both broaches may be maintained in radial alignment during all periods of operation. For this purpose the flange or face plate 5c of the yoke 5 is provided with arcuate slots 5e which are elongated circumferentially and are coaxial with the tubing. Suitable bolts 17 extend through the slots 5e and are secured to the support 4. Thus by loosening the bolts slightly the yoke 5 can be rotated about the axis of the tubing and guided during rotation by the bolts 17. Consequently both the inner and outer broaches may be adjusted circumferentially of the tubing so as to engage the tubing in the zone of the seam in all instances, even though the tube is twisted so as to dispose the seam out of its normal upright position. As the tubing passes through the broaches, the broaches automatically adjust themselves radially of the tubing and the burr and excess metal in the region of the seam is gradually and progressively cut away from both faces, the tube emerging from the broaches as a true cylindrical tube of the same thickness at and adjacent the seam cleft as elsewhere. Clearance between the inner tube walls and the side faces of both the broach 12 and shoe 13, as indicated at 18, is provided for receiving the metal removed by the broach so that it may be carried on with the tube.

Having thus described my invention, I claim:

1. In an apparatus for finishing welded tubing, including means for feeding welded tubing along a predetermined path, cutting means for effecting removal of the excess metal from the external surface of the tubing in the region of the seam of the tubing, said means comprising a series of cutting elements disposed externally of the tubing and spaced from each other longitudinally of the path of movement of the tubing, each of said elements having an arcuate cutting face extending transversely of the seam of the tubing and concave toward the tubing, the radius of the leading arcuate face being greater than the radius of the finished tubing and the radius of each succeeding face in the direction of travel of the tubing being shorter than the radius of the preceding face.

2. In an apparatus for finishing welded tubing including means for feeding the tubing, cutting means for removing excess metal along and in the region of the seam of the tubing, said cutting means comprising a rigid member elongated in the direction of travel of the tubing, a series of fixed cutting teeth thereon and having arcuate cutting faces curved in the same direction as the portions of the tubing to be engaged thereby, said teeth being spaced longitudinally from each other along the path of travel of the tubing and member, said cutting faces extending transversely of the seam, the leading cutting face being in spaced relation to the normal tube surface from which metal is to be removed, and the trailing cutting face of the series being of the same radius as the finished tube and concentric therewith, means for resiliently supporting the member for movement toward and away from the tubing, said member having sets of guides in spaced relation to each other lengthwise of the member, and each guide having portions spaced laterally from each other and engaging the tubing at opposite sides of the seam.

3. In an apparatus for finishing welded tubing including means for continuously feeding the welded tubing, cutting means for removing excess metal from the region of the seam of the tubing, said means comprising a rigid member extending longitudinally of the path of travel of the tubing, a series of external cutting elements carried by the member and fixed in relation thereto and to each other and spaced longitudinally from each other along the path of travel of the tubing and disposed transversely of the seam of the tubing, the cutting faces of said elements being arcuate and curved in the same direction as the portion of the tubing to be engaged thereby, the radius of the leading arcuate face being different from the radius of the finished tubing, and the radius of each succeeding face in the direction of travel more nearly approaching the radius of the tubing than the radius of the immediately preceding face, and means yieldably urging said rigid member toward the tubing.

4. In a device of the class described including means for feeding welded tubing along a given path, cutting means for effecting removal of the excess portions of the metal in the region of the welded seam during travel of the tubing along said path, said cutting means comprising a support, an elongated rigid head carried by the support and extending lengthwise of the tubing, longitudinally spaced cutting elements rigid with said head and in fixed spaced relation to each other therealong and extending transversely of the head, means for constraining the head from movement laterally and longitudinally while affording rocking movement of the head toward and away from the seam of the tubing about an axis transverse to the axis of the tubing, and rubber cushioning means interposed between the head and support and yieldably urging said head toward the seam of the tubing.

5. In an apparatus for finishing welded tubing and including means for feeding the tubing along a predetermined path, means for effecting removal of excess metal from the external surface of the tubing in the region of the seam of the tubing and comprising a support, a frame carried thereby and adjustable to different positions thereon, said frame and support having cooperating guide surfaces for supporting and guiding the frame during adjusting movement and constraining the frame to movement normal to the axis of the tubing and in an arcuate path coaxial with the tubing, means for securing the frame in adjusted positions, and cutting means carried by the frame and held thereby in cutting engagement with the outer surface of the tubing.

JOHN B. BORGADT.